(12) United States Patent
Sugimoto

(10) Patent No.: US 10,016,965 B2
(45) Date of Patent: Jul. 10, 2018

(54) METHOD AND APPARATUS FOR MANUFACTURING FOAMED RESIN METAL LAMINATED SHEET

(71) Applicant: Kobe Steel, Ltd., Hyogo (JP)

(72) Inventor: Akio Sugimoto, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 343 days.

(21) Appl. No.: 14/419,123

(22) PCT Filed: Aug. 21, 2013

(86) PCT No.: PCT/JP2013/072266
§ 371 (c)(1),
(2) Date: Feb. 2, 2015

(87) PCT Pub. No.: WO2014/030664
PCT Pub. Date: Feb. 27, 2014

(65) Prior Publication Data
US 2015/0246518 A1    Sep. 3, 2015

(30) Foreign Application Priority Data

Aug. 24, 2012 (JP) .................. 2012-185412

(51) Int. Cl.
*B29C 35/16* (2006.01)
*B29C 44/12* (2006.01)
(Continued)

(52) U.S. Cl.
CPC ........ *B32B 37/144* (2013.01); *B29C 44/1228* (2013.01); *B29C 44/3415* (2013.01);
(Continued)

(58) Field of Classification Search
CPC . B29C 35/16; B29C 44/1228; B29C 44/3415; B29C 44/3484; B29K 2705/02;
(Continued)

(56) References Cited

U.S. PATENT DOCUMENTS 3,411,967 A * 11/1968 Rowland .................. C08J 9/06
156/243
3,437,536 A * 4/1969 Vincent et al. ......... B32B 15/08
156/78
(Continued)

FOREIGN PATENT DOCUMENTS

JP    S56-45370 B2    10/1981
JP    S63-38299 B2     7/1988
(Continued)

OTHER PUBLICATIONS

The extended European search report issued by the European Patent Office dated Mar. 29, 2016, which corresponds to European Patent Application No. 13830680.8-1703 and is related to U.S. Appl. No. 14/419,123.
(Continued)

*Primary Examiner* — Michael A Tolin
(74) *Attorney, Agent, or Firm* — Studebaker & Brackett PC

(57) ABSTRACT

When a foamed resin metal laminated sheet (1) heated in a heating furnace (11) is cooled to room temperature, the foamed resin metal laminated sheet (1) is held at soaking temperature in a soaking bath (21) to make the temperature of the foamed resin sheet uniform over the entire area of the foamed resin metal laminated sheet (1), and then cooled to room temperature in a room temperature cooling unit (22). Thus, rippling due to thermal strain can be suppressed.

5 Claims, 11 Drawing Sheets

(51) Int. Cl.
  *B32B 5/20* (2006.01)
  *B32B 15/20* (2006.01)
  *B32B 37/08* (2006.01)
  *B32B 37/14* (2006.01)
  *B32B 15/085* (2006.01)
  *B32B 15/04* (2006.01)
  *B32B 37/18* (2006.01)
  *B32B 37/00* (2006.01)
  *B29C 44/34* (2006.01)
  *B29K 705/02* (2006.01)
  *B32B 38/00* (2006.01)
  *B29K 101/12* (2006.01)
  *B29K 705/00* (2006.01)
  *B29L 31/10* (2006.01)

(52) U.S. Cl.
  CPC .......... *B29C 44/3484* (2013.01); *B32B 5/20* (2013.01); *B32B 15/046* (2013.01); *B32B 15/085* (2013.01); *B32B 15/20* (2013.01); *B32B 37/0015* (2013.01); *B32B 37/08* (2013.01); *B32B 37/182* (2013.01); *B29C 35/16* (2013.01); *B29K 2101/12* (2013.01); *B29K 2705/00* (2013.01); *B29K 2705/02* (2013.01); *B29L 2031/10* (2013.01); *B32B 2038/0084* (2013.01); *B32B 2250/40* (2013.01); *B32B 2266/025* (2013.01); *B32B 2266/045* (2013.01); *B32B 2305/022* (2013.01); *B32B 2311/24* (2013.01); *B32B 2323/10* (2013.01); *B32B 2419/00* (2013.01)

(58) Field of Classification Search
  CPC ....... B32B 5/20; B32B 15/046; B32B 15/085; B32B 15/20; B32B 37/0015; B32B 37/08; B32B 37/144; B32B 2038/0084; B32B 2250/40; B32B 2266/025; B32B 2305/022; B32B 2311/24; B32B 2323/10; C08J 9/04; C08J 9/06
  See application file for complete search history.

(56) References Cited

U.S. PATENT DOCUMENTS

| | | | |
|---|---|---|---|
| 3,499,819 A * | 3/1970 | Lewis | C08J 5/124 156/79 |
| 3,515,615 A * | 6/1970 | Okada et al. | B29C 59/16 156/273.3 |
| 4,073,998 A | 2/1978 | O'Connor | |
| 4,279,847 A | 7/1981 | Assarsson et al. | |
| 4,438,166 A | 3/1984 | Gluck et al. | |
| 4,713,202 A * | 12/1987 | Booth | B29C 35/16 264/237 |
| 5,128,379 A | 7/1992 | Stone | |
| 5,702,652 A | 12/1997 | Ricciardi et al. | |
| 6,372,169 B1 | 4/2002 | Yasuda | |
| 2007/0144669 A1* | 6/2007 | Kikuchi | B29C 66/00441 156/311 |

FOREIGN PATENT DOCUMENTS

| | | |
|---|---|---|
| JP | H02-175734 A | 7/1990 |
| JP | 2000-085087 A | 3/2000 |
| JP | 2004-042649 A | 2/2004 |
| JP | 2009-279922 A | 12/2009 |

OTHER PUBLICATIONS

International Search Report; PCT/JP2013/072266; dated Dec. 3, 2013.
Written Opinion of the International Searching Authority; PCT/JP2013/072266; dated Dec. 3, 2013.

* cited by examiner

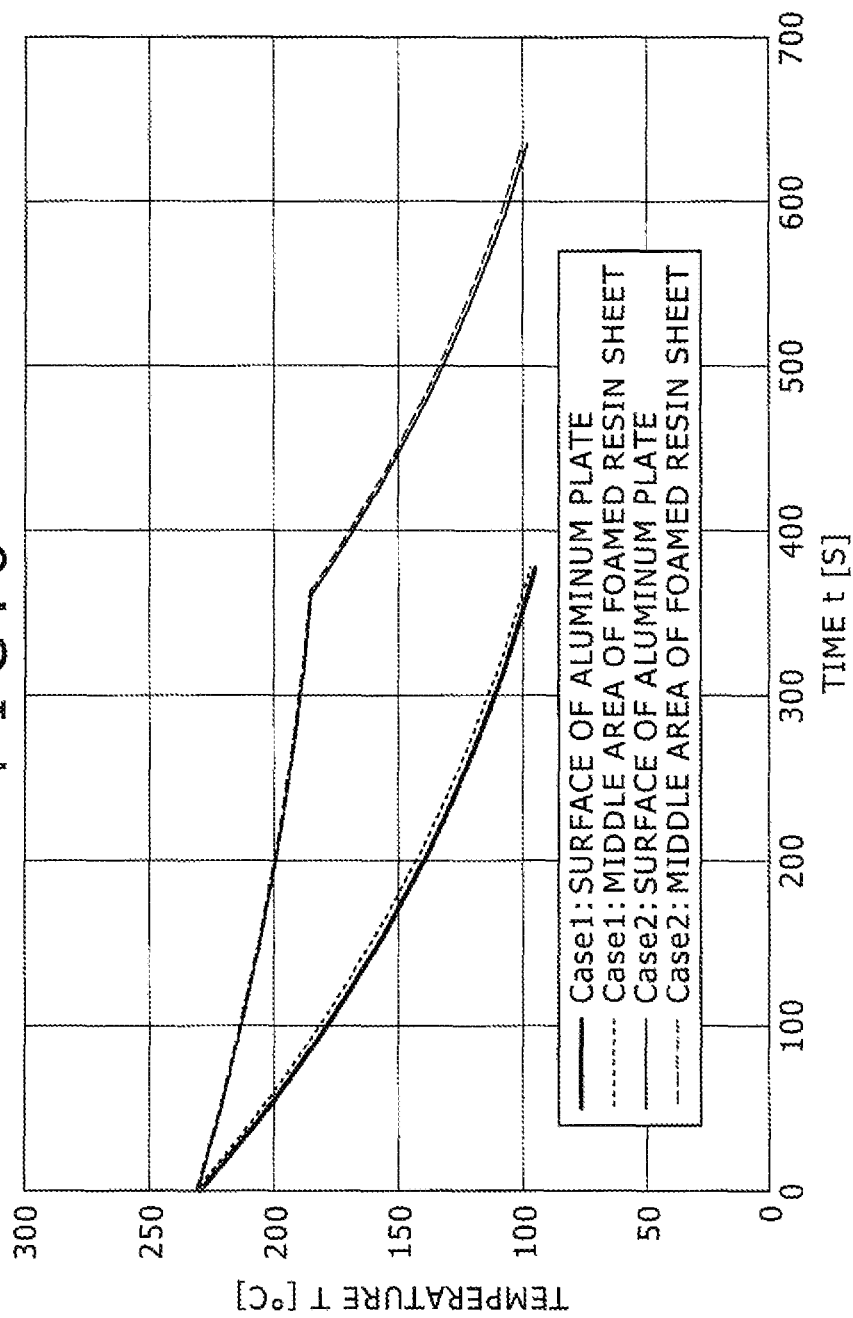

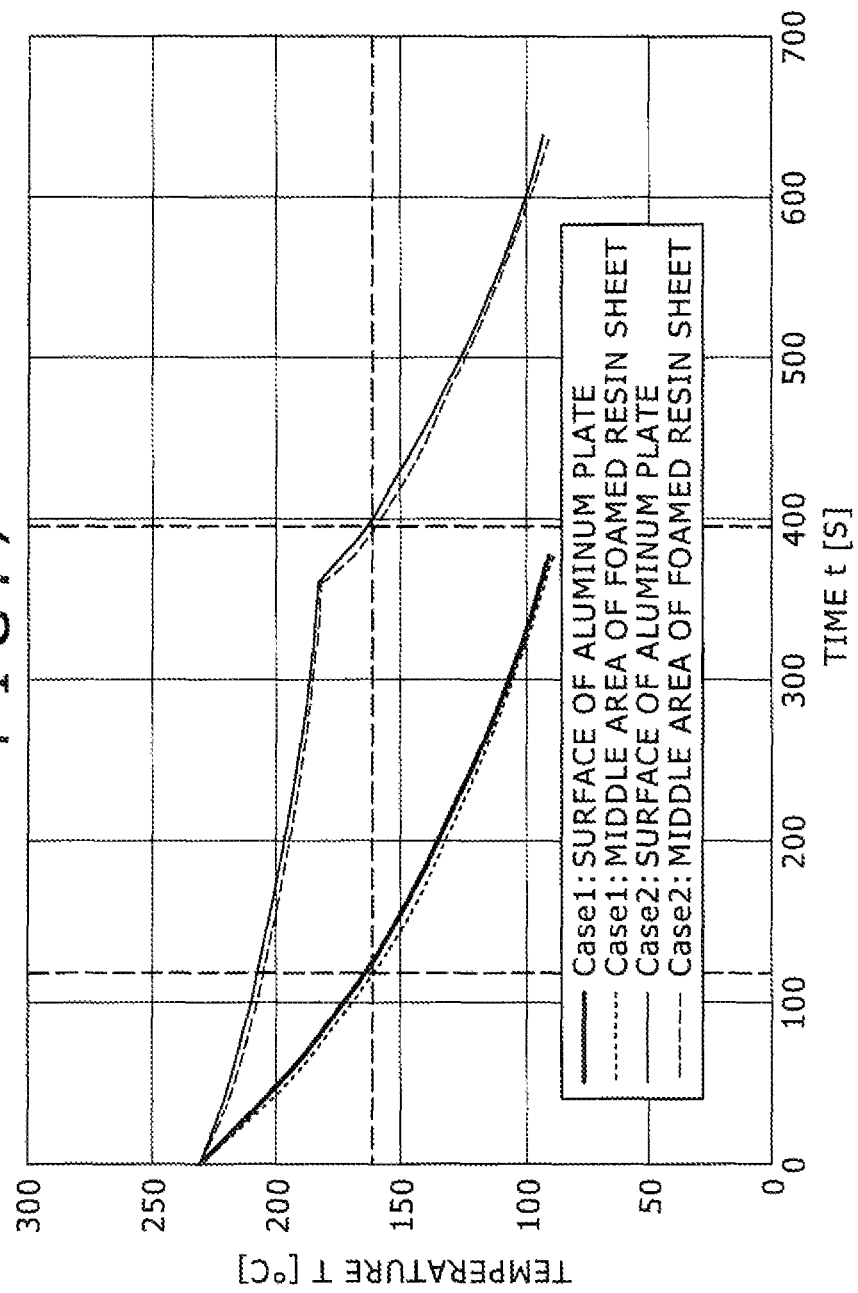

MAXIMUM ELASTIC PRINCIPAL STRAIN IN CASE 1 [AFTER 377 SEC]

MAXIMUM ELASTIC PRINCIPAL STRAIN IN CASE 2 [AFTER 637 SEC]

MINIMUM ELASTIC PRINCIPAL STRAIN IN CASE 1 [AFTER 377 SEC]

MINIMUM ELASTIC PRINCIPAL STRAIN IN CASE 2 [AFTER 637 SEC]

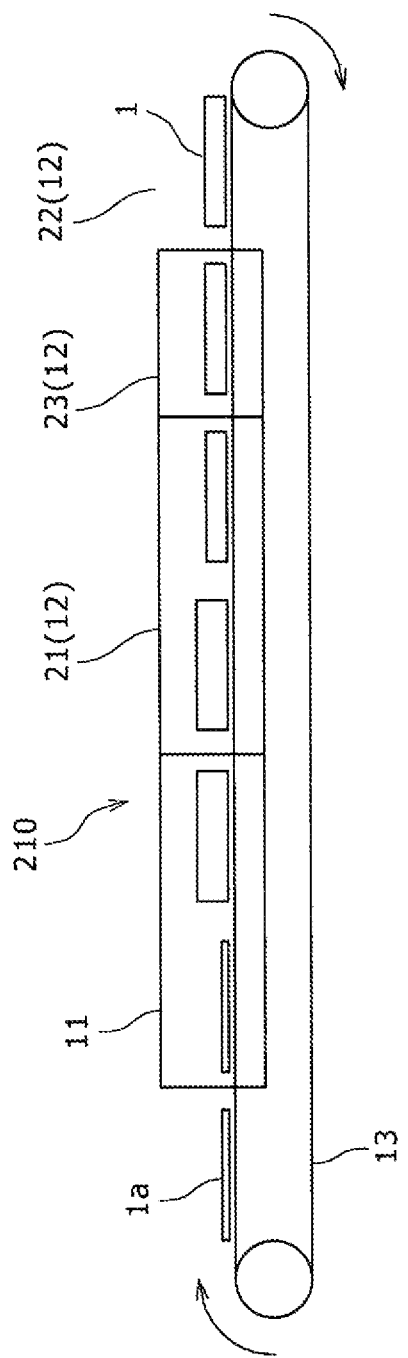

METHOD AND APPARATUS FOR MANUFACTURING FOAMED RESIN METAL LAMINATED SHEET

TECHNICAL FIELD

The present invention relates to a method and an apparatus for manufacturing a foamed resin metal laminated sheet in which metal plates are laminated on both sides of a foamed resin sheet.

BACKGROUND ART

As disclosed in Patent Document 1, a foamed resin metal laminated sheet in which metal plates are laminated on both sides of a foamed resin sheet formed by foaming a foamable resin sheet is obtained by heating a foamable resin metal laminated sheet in which metal plates are laminated on both sides of a foamable resin sheet in an unfoamed state and foaming the foamable resin sheet.

The foamable resin metal laminated sheet can be subjected to a cold press molding. That is, the foamable resin metal laminated sheet is first formed into a desired three-dimensional curved shape, and then heated by a drying furnace or the like to foam the foamable resin sheet, thereby increasing an interval distance between two metal plates. Thus, a foamed resin metal laminated sheet having higher flexural rigidity and less weight than a metal plate composed of a single material with an equal plate thickness can be obtained.

CITATION LIST

Patent Document

Patent Document 1: JP 2009-279922 A

SUMMARY OF THE INVENTION

Problems to be Solved by the Invention

A problem of obtaining such foamed resin metal laminated sheet lies in the fact that in-plane strain of thermal contraction generated during a cooling step after heating and foaming is large enough to cause rippling phenomenon, so that a molded article having a flat shape can not be obtained. This problem is of small account when a molded article having a deeply drawn shape is press-molded due to its increased geometrical rigidity, however it becomes significant when a foamed resin metal laminated sheet in a flat shape, or a foamed resin metal laminated sheet having a relatively flat and smooth curved surface is to be obtained.

It is considered that the problem described above arises with the following mechanism. As an example, consider a rectangular foamable resin metal laminated sheet in which aluminum plates are laminated on both sides of a foamable resin sheet in an unfoamed state made of polypropylene having a melting point of 160° C. and a foaming temperature of 210° C. Then, consider a situation where this foamable resin metal laminated sheet undergoes a thermal history starting from room temperature (20° C.), passing through a heating and a foaming process in a drying furnace (210° C., about 17 min.), and then being cooled to the room temperature. The surface plate is made of aluminum in this example. Since a heat-ray is incapable to heat the aluminum plate due to reflection in a far infrared radiation heating method, a hot gas circulation type heating furnace is used for heating.

During the heating process, the peripheral area of the rectangular foamable resin sheet exposed to the outside is directly blown by hot air, while the middle area of the foamable resin sheet is not heated until after the aluminum plate is heated. Thus, the peripheral area of the foamable resin sheet directly blown by hot air has a higher temperature rise rate than the middle area. This causes a variation in temperature distribution inside of the flat sheet in the heating furnace at the same time point, however a foaming ratio of the foamable resin sheet can be set evenly over the entire area of the foamable resin metal laminated sheet if sufficient heating time is provided (e.g. about 17 min.). A foamed resin sheet formed by foaming the foamable resin sheet is in a molten state having viscosity, and the foamed resin sheet has Young's modulus far smaller than that of aluminum. Thus, a shape of the foamed resin metal laminated sheet can be maintained flat as far as a shape of aluminum plate is flat.

The foamed resin metal laminated sheet is cooled to room temperature after heating in the heating furnace. In this process, the rectangular foamed resin sheet contains many air bubbles and has a low thermal conductivity. Thus, heat in the middle area is dissipated to the surroundings only through the aluminum plate instead of being transferred into the in-plane direction, while heat in the peripheral area exposed to the outside is directly dissipated to the air. Thus, the temperature in the peripheral area of the foamed resin sheet drops faster than the middle area and reaches below a melting point thereby solidifying the peripheral area. Since the foamed resin sheet also serves as a heat storage material, the temperature of the aluminum plate in the middle area hardly drops, while the temperature of the aluminum plate in the peripheral area drops as the foamed resin sheet is solidified. This causes a big difference in thermal strain between the middle area and the peripheral area of the aluminum plate. As a result, rippling phenomenon occurs over the entire area of the foamed resin metal laminated sheet.

An object of the present invention is to provide a method and an apparatus for manufacturing a foamed resin metal laminated sheet capable of suppressing the rippling phenomenon caused by thermal strain.

Means for Solving the Problems

A method for manufacturing a foamed resin metal laminated sheet of the present invention is characterized by comprising a laminating step for laminating metal plates on both sides of a foamable resin sheet in an unfoamed state to form a foamable resin metal laminated sheet, a heating step for heating the foamable resin metal laminated sheet and foaming the foamable resin sheet to form a foamed resin metal laminated sheet, and a cooling step for cooling the foamed resin metal laminated sheet to room temperature, the cooling step comprising a soaking step for cooling the foamed resin metal laminated sheet to a soaking temperature lower than a foaming temperature of the foamable resin sheet and higher than the room temperature and holding the foamed resin metal laminated sheet at the soaking temperature, and a room temperature cooling step for cooling the foamed resin metal laminated sheet to the room temperature after the soaking step.

According to the configuration described above, when the foamed resin metal laminated sheet is cooled to the room temperature, it is temporarily cooled to the soaking temperature and held at the soaking temperature, and then cooled to the room temperature. A variation in cooling speed in the foamed resin sheet can be suppressed by temporarily holding the foamed resin metal laminated sheet at the soaking temperature to make the temperature of the foamed resin sheet formed by foaming the foamable resin sheet uniform over the entire area of the foamed resin metal laminated sheet before the foamed resin metal laminated sheet is cooled to the room temperature. In this way, the rippling phenomenon due to thermal strain caused by the variation in cooling speed in the foamed resin sheet can be suppressed.

In the method for manufacturing the foamed resin metal laminated sheet of the present invention, the soaking temperature may be set in the range of not lower than Tm but not higher than 1.3 Tm, where Tm represents a melting point of a foamable resin of the foamable resin sheet. According to the configuration described above, by setting the soaking temperature in the range of not lower than Tm but not higher than 1.3 Tm, where Tm represents the melting point of the foamable resin of the foamable resin sheet, the foamed resin sheet can be kept melted in the entire area of the foamed resin metal laminated sheet in the soaking step for holding the foamed resin metal laminated sheet at the soaking temperature. In this way, the initiation timing of solidifying the foamed resin sheet can be synchronized in the entire area of the foamed resin metal laminated sheet in the transition from the soaking step to a room temperature cooling step, thus the variation in cooling speed in the foamed resin sheet can be further suppressed. The foamed resin sheet is changed at phase from a liquid phase to a solid phase by cooling. Thus the melting point described here means a congealing point in a strict sense. The melting point matches the congealing point without a hysteresis effect.

In the method for manufacturing the foamed resin metal laminated sheet of the present invention, the cooling step may further comprise a second soaking step between the soaking step and the room temperature cooling step for cooling the foamed resin metal laminated sheet at a second soaking temperature lower than the soaking temperature and higher than the room temperature and holding the foamed resin metal laminated sheet at the second soaking temperature. According to the configuration described above, the variation in cooling speed in the foamed resin sheet can be further suppressed by holding the foamed resin metal laminated sheet at the soaking temperature first to make the temperature of the foamed resin sheet uniform over the entire area of the foamed resin metal laminated sheet, and then further holding the foamed resin metal laminated sheet at the second soaking temperature to make the temperature of the foamed resin sheet uniform over the entire area of the foamed resin metal laminated sheet.

In the method for manufacturing the foamed resin metal laminated sheet of the present invention, the second soaking step may be performed a plurality of times at the second soaking temperature lower than the previous second soaking temperature. According to the configuration described above, the variation in cooling speed in the foamed resin sheet can be further suppressed by decreasing stepwise the temperature of the foamed resin sheet through repeating a plurality of times the step of temporally holding the foamed resin metal laminated sheet at the second soaking temperature while lowering the second soaking temperature each time to make the temperature of the foamed resin sheet uniform over the entire area of the foamed resin metal laminated sheet.

In the method for manufacturing the foamed resin metal laminated sheet of the present invention, the foamable resin sheet may contain polypropylene and the metal plates may contain aluminum. According to the configuration described above, the uniform foaming performance can be obtained by using the foamable resin sheet containing polypropylene. Rigidity and lightweight properties of the foamed resin metal laminated sheet can be improved by using the metal plates containing aluminum.

An apparatus for manufacturing a foamed resin metal laminated sheet of the present invention is characterized by comprising a heating unit for heating a foamable resin metal laminated sheet in which metal plates are laminated on both sides of a foamable resin sheet in an unfoamed state and foaming the foamable resin sheet to form a foamed resin metal laminated sheet, and a cooling unit for cooling the foamed resin metal laminated sheet to room temperature, the cooling unit comprising a soaking unit for cooling the foamed resin metal laminated sheet to a soaking temperature lower than a foaming temperature of the foamable resin sheet and higher than the room temperature, and holding the foamed resin metal laminated sheet at the soaking temperature, and a room temperature cooling unit provided on the downstream side of the soaking unit for cooling the foamed resin metal laminated sheet to the room temperature.

According to the configuration described above, when the foamed resin metal laminated sheet is cooled to the room temperature, it is temporarily cooled to the soaking temperature and held at the soaking temperature, and then cooled to the room temperature. A variation in cooling speed in the foamed resin sheet can be suppressed by temporarily holding the foamed resin metal laminated sheet at the soaking temperature to make the temperature of the foamed resin sheet formed by foaming the foamable resin sheet uniform over the entire area of the foamed resin metal laminated sheet before the foamed resin metal laminated sheet is cooled to the room temperature. In this way, rippling phenomenon due to thermal strain caused by a variation in cooling speed in the foamed resin sheet can be suppressed.

In the apparatus for manufacturing the foamed resin metal laminated sheet of the present invention, the soaking temperature may be set in the range of not lower than Tm but not higher than 1.3 Tm, where Tm represents a melting point of a foamable resin of the foamable resin sheet. According to the configuration described above, by setting the soaking temperature in the range of not lower than Tm but not higher than 1.3 Tm, where Tm represents the melting point of the foamable resin of the foamable resin sheet, the foamed resin sheet can be kept melted in the entire area of the foamed resin metal laminated sheet in the soaking unit for holding the foamed resin metal laminated sheet at the soaking temperature. In this way, the initiation timing of solidifying the foamed resin sheet can be synchronized in the entire area of the foamed resin metal laminated sheet in the transition from the soaking unit to the room temperature cooling unit, thus the variation in cooling speed in the foamed resin sheet can be further suppressed.

In the apparatus for manufacturing the foamed resin metal laminated sheet of the present invention, the cooling unit may further comprise a second soaking unit between the soaking unit and the room temperature cooling unit for cooling the foamed resin metal laminated sheet at a second soaking temperature lower than the soaking temperature and higher than the room temperature and holding the foamed resin metal laminated sheet at the second soaking temperature. According to the configuration described above, the variation in cooling speed in the foamed resin sheet can be further suppressed by holding the foamed resin metal laminated sheet at the soaking temperature first to make the temperature of the foamed resin sheet uniform over the entire area of the foamed resin metal laminated sheet, and then further holding the foamed resin metal laminated sheet at the second soaking temperature to make the temperature of the foamed resin sheet uniform over the entire area of the foamed resin metal laminated sheet.

In the apparatus for manufacturing the foamed resin metal laminated sheet of the present invention, the apparatus may be provided with two or more the second soaking units in tandem so that the soaking temperature becomes lower in order of the second soaking units. According to the configuration described above, the variation in cooling speed in the foamed resin sheet can be further suppressed by decreasing stepwise the temperature of the foamed resin sheet through repeating a plurality of times the step of temporally holding the foamed resin metal laminated sheet at the second soaking temperature while lowering the second soaking temperature each time to make the temperature of the foamed resin sheet uniform over the entire area of the foamed resin metal laminated sheet.

In the apparatus for manufacturing the foamed resin metal laminated sheet of the present invention, the foamable resin sheet may contain polypropylene and the metal plates may contain aluminum. According to the configuration described above, the uniform foaming performance can be obtained by using the foamable resin sheet containing polypropylene. Rigidity and lightweight properties of the foamed resin metal laminated sheet can be improved by using the metal plates containing aluminum.

In the apparatus for manufacturing the foamed resin metal laminated sheet of the present invention, the soaking unit may be a hot gas circulation type heating furnace. According to the configuration described above, metals that are not efficiently heated by a far infrared radiation heating method due to heat-ray reflection can also be suitably heated by the soaking unit using the hot gas circulation type heating furnace.

Effects of the Invention

According to a method and an apparatus for manufacturing foamed resin metal laminated sheet of the present invention, a variation in cooling speed in a foamed resin sheet can be suppressed by temporarily holding a foamed resin metal laminated sheet at a soaking temperature to make the temperature of the foamed resin sheet formed by foaming a foamable resin sheet uniform over the entire area of the foamed resin metal laminated sheet before the foamed resin metal laminated sheet is cooled to room temperature. In this way, rippling phenomenon due to thermal strain caused by a variation in cooling speed in the foamed resin sheet can be suppressed.

BRIEF DESCRIPTION OF THE DRAWINGS

FIG. 6 is a graph showing calculation results of temperature changes on the surface of the aluminum plate and in the middle area of the foamed resin sheet at a representative point provided on the central part of the flat sheet.

FIG. 7 is a graph showing calculation results of temperature changes on the surface of the aluminum plate and in the middle area of the foamed resin sheet at a representative point provided on the peripheral area of the flat sheet.

FIG. 11 is a schematic view showing a manufacturing apparatus according to a second embodiment of the present invention.

DESCRIPTION OF EMBODIMENTS

Hereinafter, preferred embodiments of the present invention will be described with reference to the drawings. A foamed resin metal laminated sheet obtained by the method for manufacturing a foamed resin metal laminated sheet according to the present invention can be used, for example, as a material for a structure constituting a body of a bullet train, an airplane, or the like. Further, the foamed resin metal laminated sheet can be widely used as a material for a floor, a wall, or a ceiling of building or the like.

First Embodiment (Configuration of Foamed Resin Metal Laminated Sheet)

Figure 1A:
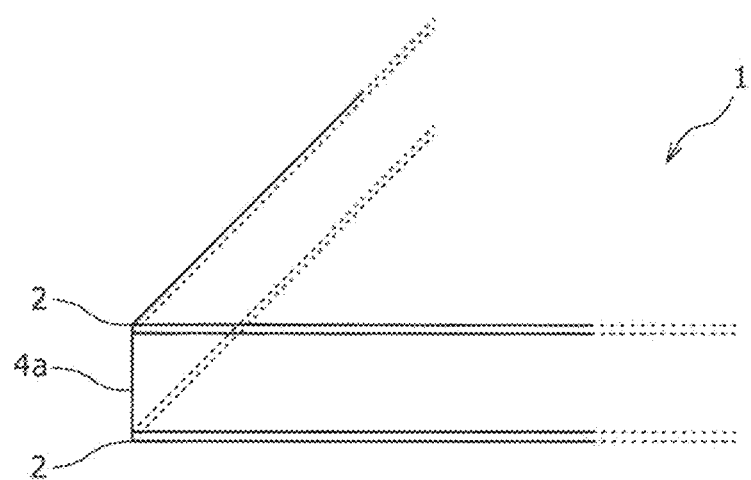
FIG. 1A is a partial perspective view of a foamed resin metal laminated sheet.
Figure 1B:
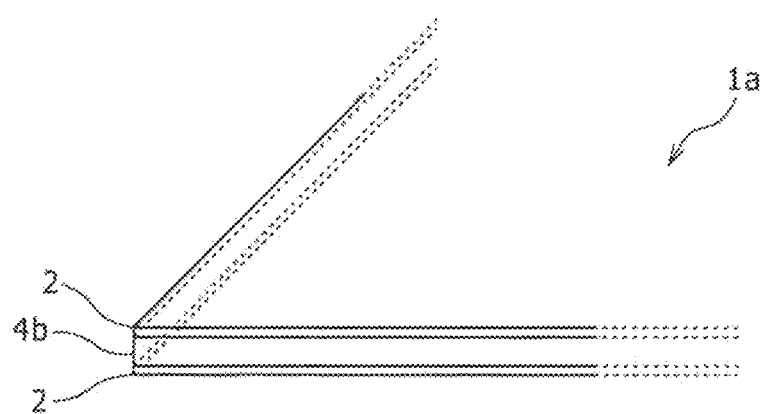
FIG. 1B is a partial perspective view of a foamable resin metal laminated sheet.

As shown in FIG. 1A, a foamed resin metal laminated sheet 1 manufactured by a method for manufacturing a foamed resin metal laminated sheet according to a first embodiment of the present invention is composed of a foamed resin sheet 4a in a foamed state and two aluminum plates 2 laminated on both sides of the foamed resin sheet 4a. The foamed resin metal laminated sheet 1 is formed by heating a foamable resin metal laminated sheet 1a shown in FIG. 1B and foaming a foamable resin sheet 4b in an unfoamed state. The foamable resin metal laminated sheet 1a is composed of the foamable resin sheet 4b in an unfoamed state and two aluminum plates 2 laminated on both sides of the foamable resin sheet 4b.

The foamed resin sheet 4a in the foamed resin metal laminated sheet 1 includes a mass of individually independent cells (closed cells). Thus, the foamed resin metal laminated sheet 1 exhibits higher flexural rigidity and more lightweight than an aluminum plate composed of a single aluminum material with an equal plate thickness. Rigidity of the foamed resin metal laminated sheet 1 differs significantly between the case where the foamed resin metal laminated sheet 1 is formed by foaming the foamable resin sheet 4b after the foamable resin metal laminated sheet 1a is press-molded in a desired shape, and the case where a laminated sheet is obtained by laminating aluminum plates on both sides of a foamed resin sheet foamed in advance, and then the laminated sheet is press-molded in a desired shape. In the latter case, press molding is performed to the foamed resin sheet foamed in advance, thus a mass of closed cells contained in the foamed resin sheet are mostly crushed and fused to the adjacent cells thereby causing a reduction in rigidity. Whereas, in the former case, the foamable resin sheet 4b is foamed after press molding thereby maintaining a mass of closed cells and gaining high rigidity.

The foamed resin metal laminated sheet 1 is composed of the foamed resin sheet 4a and two metal plates (aluminum plates) 2 laminated on both sides of the foamed resin sheet 4a, however, the configuration of the foamed resin metal laminated sheet is not limited thereto. In the foamed resin metal laminated sheet 1, an unfoamable resin sheet may be further disposed between the foamed resin sheet 4a and the metal plates 2, or two foamed resin sheets 4a may be alternately disposed among three metal plates 2 arranged in parallel. Essentially a foamed resin metal laminated sheet may be any foamed resin metal laminated sheet comprising at least one foamed resin sheet and at least two metal plates laminated on both sides of the foamed resin sheet.

The foamable resin sheet 4b contains a matrix resin and a foaming agent. Examples of the matrix resin include polyolefin-based resins, polystyrene-based resins, polyurethane-based resins, polyester-based resins, and the like. Examples of polyolefin-based resins include polypropylene resins, polyethylene resins, polyolefin resins, EPR, EPDM, and the like. Examples of polystyrene-based resins include polystyrene resins, thermoplastic elastomers, ABS resins, AS resins, and the like. These resins are thermoplastic resins and have property of being softened and increasing plasticity by heating.

The foaming agent includes an organic foaming agent and an inorganic foaming agent. Examples of the organic foaming agent include azo compounds, nitroso compounds, sulfonylhydrazide compounds, and the like, and specific examples include azodicarbonamide (ADCA), barium azodicarboxylate, azobisisobutyronitrile, N, N'-dinitrosopenta methylene tetramine, p-toluenesulfonyl hydrazide, p, p'-oxybis(benzenesulfonyl hydrazide), and the like. Examples of the inorganic foaming agent include sodium hydrogen carbonate, zinc carbonate, heat-expandable microcapsules, and the like. It is necessary to select a foaming agent having a foaming temperature (decomposition temperature) higher than a melting point of a matrix resin by about 20° C. One kind of foaming agent may be used alone or two or more kinds of foaming agents may be used in combination.

The metal plates 2 are not limited to the aluminum plates 2 and may be metal plates such as aluminum alloy plates, stainless plates, and plating steel plates.

The foamable resin sheet 4b and the aluminum plates 2 may be adhered using an adhesive, or welded at temperature lower than the foaming temperature of the foamable resin sheet 4b.

(Apparatus for Manufacturing Foamed Resin Metal Laminated Sheet)

Figure 2A:
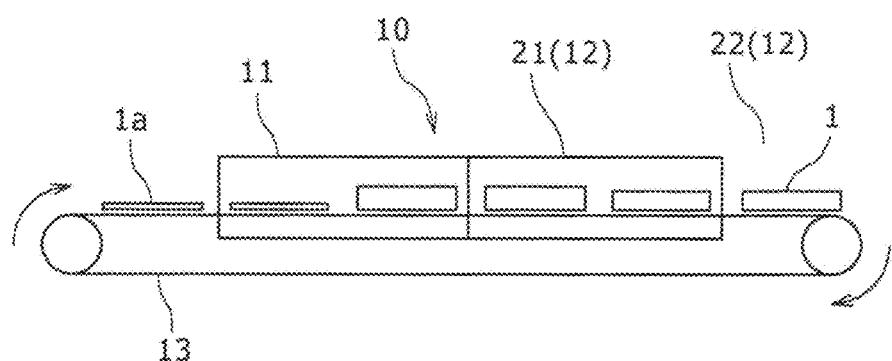
FIG. 2A is a schematic view of a manufacturing apparatus according to a first embodiment of the present invention.

As shown in FIG. 2A, an apparatus for manufacturing a foamed resin metal laminated sheet (manufacturing apparatus) 10 of the present embodiment is equipped with a heating furnace (heating unit) 11 and a cooling unit 12. Hereinafter, the present embodiments will be described along with the manufacturing method.

(Laminating Step)

First, a foamable resin metal laminated sheet 1a is formed by laminating aluminum plates 2 on both sides of a foamable resin sheet 4b in an unfoamed state. More specifically, the foamable resin metal laminated sheet 1a obtained by adhering the aluminum plates 2 to both sides of the foamable resin sheet 4b is placed on a conveyor 13.

The foamable resin metal laminated sheet 1a of the present embodiment is formed by adhering the aluminum plates 2 having the thickness of 0.15 mm to both sides of the foamable resin sheet 4b having the thickness of 0.9 mm. The foamable resin sheet 4b of the present embodiment uses a polypropylene resin as a matrix resin to which a foaming agent (heat decomposition temperature of 195° C.) is added and kneaded. The final thickens of the foamed resin sheet 4a after heating and foaming is designed to become 2.7 mm (three times thicker than before foaming).

(Heating Step)

Next, the foamable resin metal laminated sheet 1a is conveyed into the heating furnace 11 to heat the foamable resin metal laminated sheet 1a. The heating furnace 11 is a hot gas circulation type heating furnace capable of heating the aluminum plates 2, which would reflect a heat-ray in a far infrared radiation heating method. Heating temperature in the heating furnace 11 is set to 230° C., which is higher than 210° C. of a foaming temperature of the foamable resin sheet 4b. The foamable resin sheet 4b is foamed by heating to become the foamed resin sheet 4a. Thus, the foamable resin metal laminated sheet 1a becomes the foamed resin metal laminated sheet 1.

During heating, a temperature rise rate of the foamable resin sheet 4b is higher in the peripheral area where hot air directly hits than in the middle area of the rectangular foamable resin metal laminated sheet 1a. However, the foaming ratio of the foamable resin sheet 4b can be set evenly over the entire area of the foamable resin metal laminated sheet 1a if sufficient heating time is provided.

(Cooling Step)

Next, the foamed resin metal laminated sheet 1 is conveyed into the cooling unit 12 to cool the foamed resin metal laminated sheet 1 to room temperature (20° C.). The cooling unit 12 is equipped with a soaking bath (soaking unit) 21 continuing with the heating furnace 11, and a room temperature cooling unit 22 exposed to the air.

The soaking bath 21 is a hot gas circulation type heating furnace and the temperature inside the soaking bath 21 is kept at the soaking temperature lower than the foaming temperature of the foamable resin sheet 4b (210° C.) and higher than the room temperature (20° C.). The foamed resin metal laminated sheet 1 conveyed into the soaking bath 21 is cooled to the soaking temperature and temporally held at the soaking temperature.

The soaking temperature is set in the range of not lower than Tm and not higher than (1.3×Tm), where Tm represents a melting point of a foamed resin of the foamable resin sheet 4b (foamed resin sheet 4a). Thus, the foamed resin sheet 4a is in a melted state in the entire area of the foamed resin metal laminated sheet 1 held at the soaking temperature.

Subsequently, the foamed resin metal laminated sheet 1 conveyed into the room temperature cooling unit 22 exposed to the air is cooled from the soaking temperature to the room temperature in the air. The foamed resin sheet 4a in a melted state in the soaking bath 21 starts to solidify synchronously in the entire area of the foamed resin metal laminated sheet 1 after conveyed into the room temperature cooling unit 22. Thus the variation in cooling speed in the foamed resin sheet 4a can be suppressed.

Figure 2B:
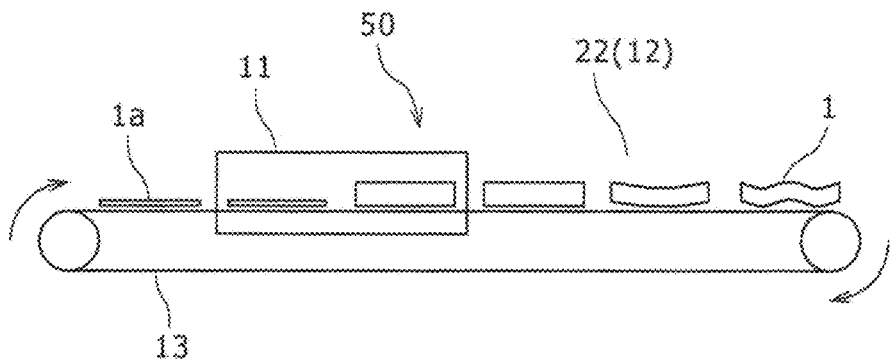
FIG. 2B is a schematic view of a conventional manufacturing apparatus.

In contrast, as shown in FIG. 2B, in a conventional manufacturing apparatus 50 having no soaking bath 21, the variation in cooling speed in the foamed resin sheet 4a is generated in the entire area of the foamed resin metal laminated sheet 1 when conveyed from the heating furnace 11 to the room temperature cooling unit 22 exposed to the air. More specifically, the peripheral area solidifies faster than the middle area of the rectangular foamed resin sheet 4a. Thus rippling phenomenon due to thermal strain occurs in the foamed resin metal laminated sheet 1.

Figure 3A:
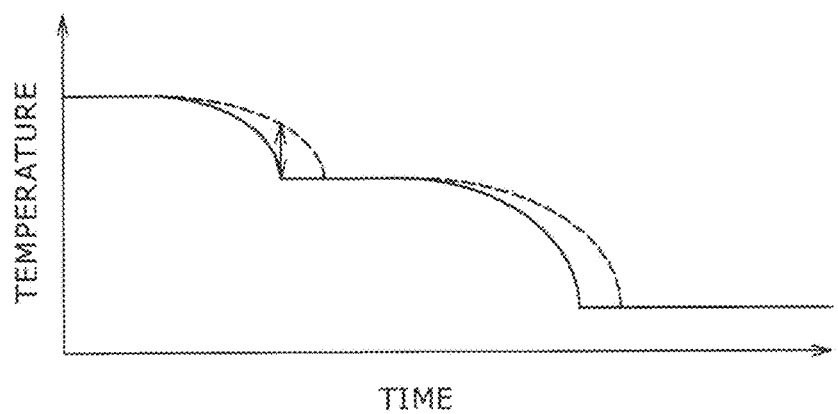
FIG. 3A is a schematic view showing a temperature change.

FIG. 3A is a schematic view showing a temperature change when the foamed resin metal laminated sheet 1 is temporally held at the soaking temperature using the soaking bath 21. Note that dotted lines indicate surface temperature of the middle area of the foamed resin metal laminated sheet, while solid lines indicate surface temperature of the peripheral area of the aluminum plate in FIGS. 3A and B. As shown in FIG. 3A, this method reduces a temperature difference in surface temperature between the middle area and the peripheral area of the aluminum plate 2 in the rectangular foamed resin metal laminated sheet 1. Thus the rippling phenomenon due to thermal strain caused by the variation in cooling speed in the foamed resin sheet 4a can be suppressed.

Figure 3B:
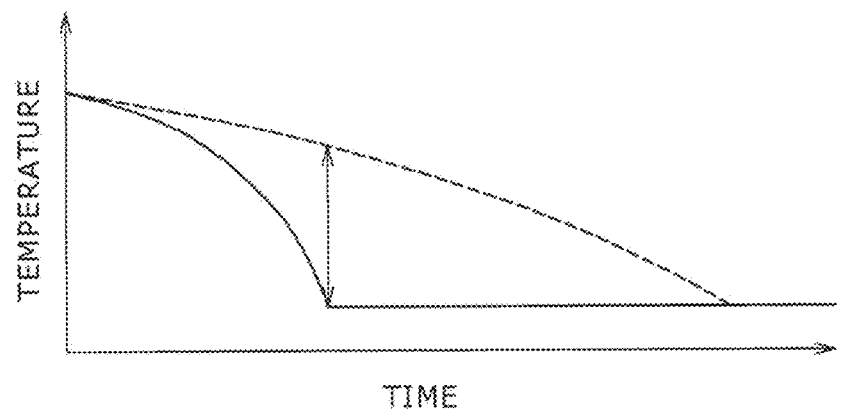
FIG. 3B is a schematic view showing a temperature change in the conventional apparatus.

In contrast, as shown in FIG. 3B, a conventional cooling method without using the cooling bath 21 causes a large temperature difference in surface temperature between the middle area and the peripheral area of the aluminum plate 2 in the rectangular foamed resin metal laminated sheet 1. Thus the rippling phenomenon due to thermal strain caused by the variation in cooling speed in the foamed resin sheet 4a occurs.

As shown in FIG. 2A, the heating furnace 11 and the soaking bath 21 are separately provided in the present embodiment, however, a configuration in which the heating furnace 11 doubles as the soaking bath 21 may also be used. That is, after heating and foaming the foamable resin sheet 4b by setting the temperature of the heating furnace 11 to 230° C. higher than the foaming temperature, the foamed resin metal laminated sheet 1 may be held at the soaking temperature by lowing the temperature of the heating furnace 11 to the soaking temperature.

(Analysis)

Using a 1 m×1 m flat sheet (foamed resin metal laminated sheet 1) composed of the aluminum plates 2 having the thickness of 0.15 mm and the foamed resin sheet 4a made of foamed polypropylene having the thickness of 3 mm as a analysis object, temporal changes of temperature distribution of the aluminum plates 2 and the foamed resin sheet 4a by a nonstationary heat conduction analysis, as well as temporal changes of thermal strain distribution of aluminum plates 2 were calculated. Physical properties of the aluminum plates 2 and the foamed resin sheet 4a are shown in Table 1 and Table 2, respectively.

TABLE 1

| Temperature [° C.] | Young's modulus [MPa] | Poisson ratio [—] | Density [kg/m³] | Specific heat [J/kgK] | Thermal conductivity [W/mK] | Linear expansion coefficient [1/K] |
|---|---|---|---|---|---|---|
| 20 | 69529 | 0.327 | 2660 | 900 | 127 | 2.39 × 10⁻⁵ |

TABLE 2

| Temperature [° C.] | Young's modulus [MPa] | Poisson ratio [—] | Density [kg/m³] | Specific heat [J/kgK] | Thermal conductivity [W/mK] | Linear expansion coefficient [1/K] |
|---|---|---|---|---|---|---|
| 20 | 80.3 | 0.45 | 310.2 | 1243 | 0.1 | 1.1 × 10⁻⁴ |
| 40 | 52.0 | | | | | |
| 60 | 34.2 | | | | | |
| 80 | 22.0 | | | | | |
| 100 | 10.7 | | | | | |
| 120 | 5.4 | | | | | |
| 140 | 1.0 | | | | | |
| 160 | 0.1 | | | | | |
| 230 | 0.1 | 0.49 | | | | |

Since the foamed resin sheet 4a melts at not lower than 160° C., Young's modulus of the foamed resin sheet 4a at 160° C. and 230° C. was estimated as ¹⁄₁₀ of Young's modulus of the foamed resin sheet 4a at 140° C. in Table 2. Values of density and specific heat of the foamed resin sheet 4a containing the air at a volume ratio of 66% are shown. As a value of linear expansion coefficient of the foamed resin sheet 4a, a value of the foamed polypropylene described in the Sankyo Kasei Sangyo Co., Ltd's home page in the internet site was used (see: http://www.sankyo-kasei.co.jp/item/seihin/y5_101_02happopp.htm).

Figure 4A:
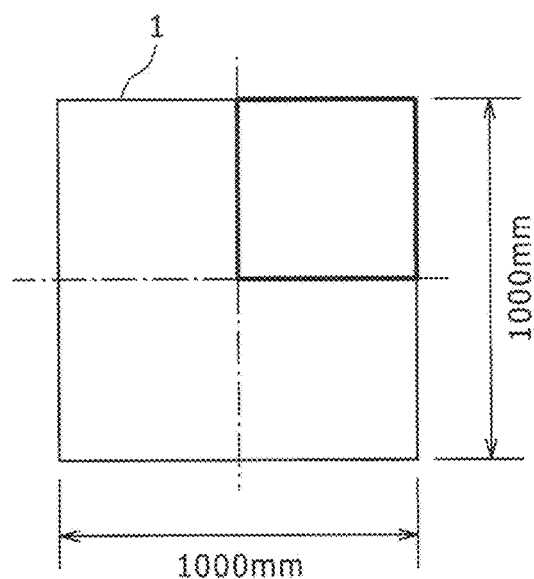
FIG. 4A is a plane view showing an analysis model.
Figure 4B:
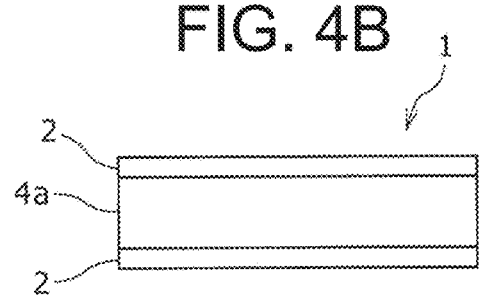
FIG. 4B is a side view of FIG. 4A.
Figure 5A:
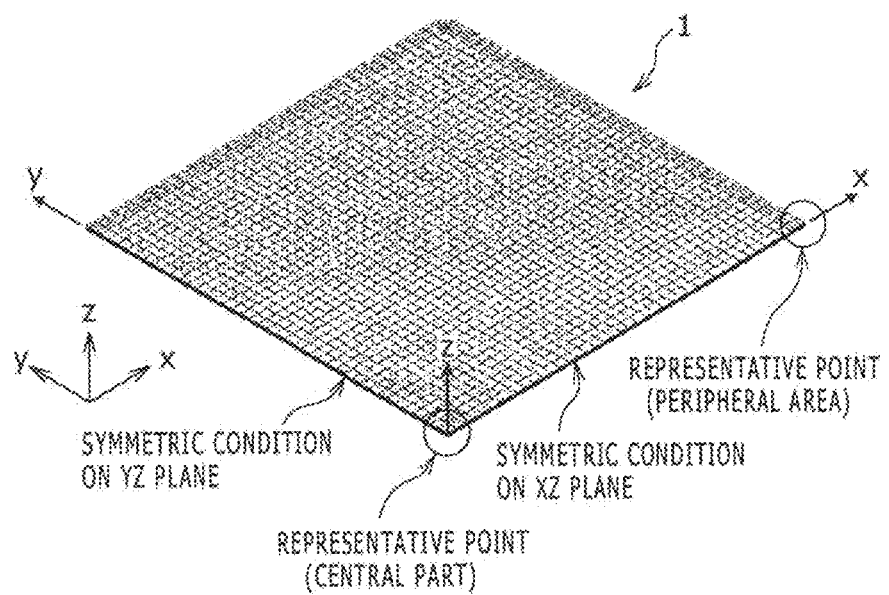
FIG. 5A is a view showing an analysis model.

As shown in FIGS. 4A and B, and FIGS. 5A and B, a ¼ symmetric model was employed as an analysis model. As calculation conditions of the nonstationary heat conduction analysis, initial conditions, cooling conditions, displacement constraint conditions, and time periods of calculation were set as following. In this analysis, Case 1 represented a case where a product was manufactured by a conventional method without using the soaking bath 21, whereas Case 2 represented a case where a product was manufactured by the method of the present embodiment using the soaking bath 21.

In Case 1 and Case 2, a foamed resin metal laminated sheet 1, fresh from the heating furnace 11 represented the initial conditions in which the temperature was always set to 230° C. and initial strain was considered to be zero.

As cooling conditions in Case 1, a foamed resin metal laminated sheet 1, fresh from the heating furnace 11 was cooled by natural convection and radiation in the air. The atmospheric temperature was set to 20° C. and the surface heat transfer coefficient was set to 3 W/m²K for natural convection, while the atmospheric temperature was set to 20° C. and emissivity was set to 0.02 for radiation.

As cooling conditions in Case 2, on the other hand, a foamed resin metal laminated sheet 1, fresh from the heating furnace 11 was cooled to the soaking temperature in the soaking bath 21, temporally hold at the soaking temperature, and then cooled by natural convection and radiation in the air. The processing time was set to 360 s, the ambient temperature was set to 160° C., and the surface heat transfer coefficient was set to 3 W/m²K for natural convection in the soaking bath 21, while the processing time was set to 360 s, the external temperature was set to 160° C., and the emissivity was set to 0.02 for radiation in the soaking bath 21. The atmospheric temperature was set to 20° C. and the surface heat transfer coefficient was set to 3 W/m²K for natural convection in the air, while the atmospheric temperature was set to 20° C. and the emissivity was set to 0.02 for radiation in the air.

Displacement constraint conditions did not apply to Case 1 or Case 2, and time periods of calculation in Case 1 and Case 2 were until the temperature of representative points becomes about 100° C. or less. As shown in FIG. 5A, one representative point was provided each in the central part and the peripheral area of the flat sheet.

Figure 5B:
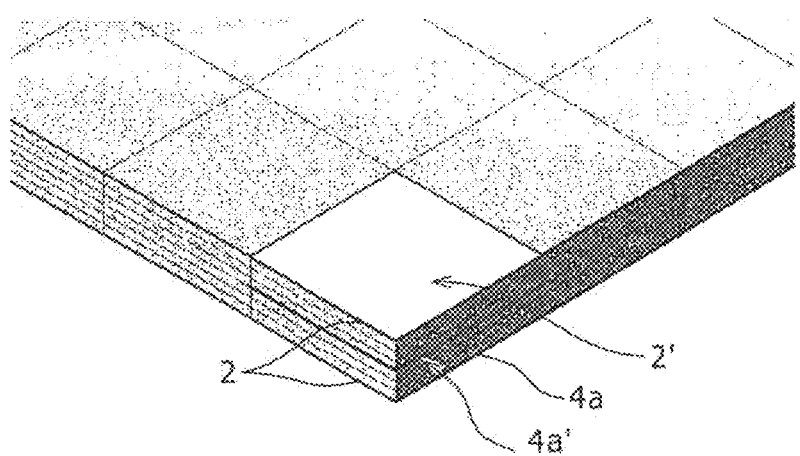
FIG. 5B is an enlarged view of an essential part of FIG. 5A.
Figure 8:
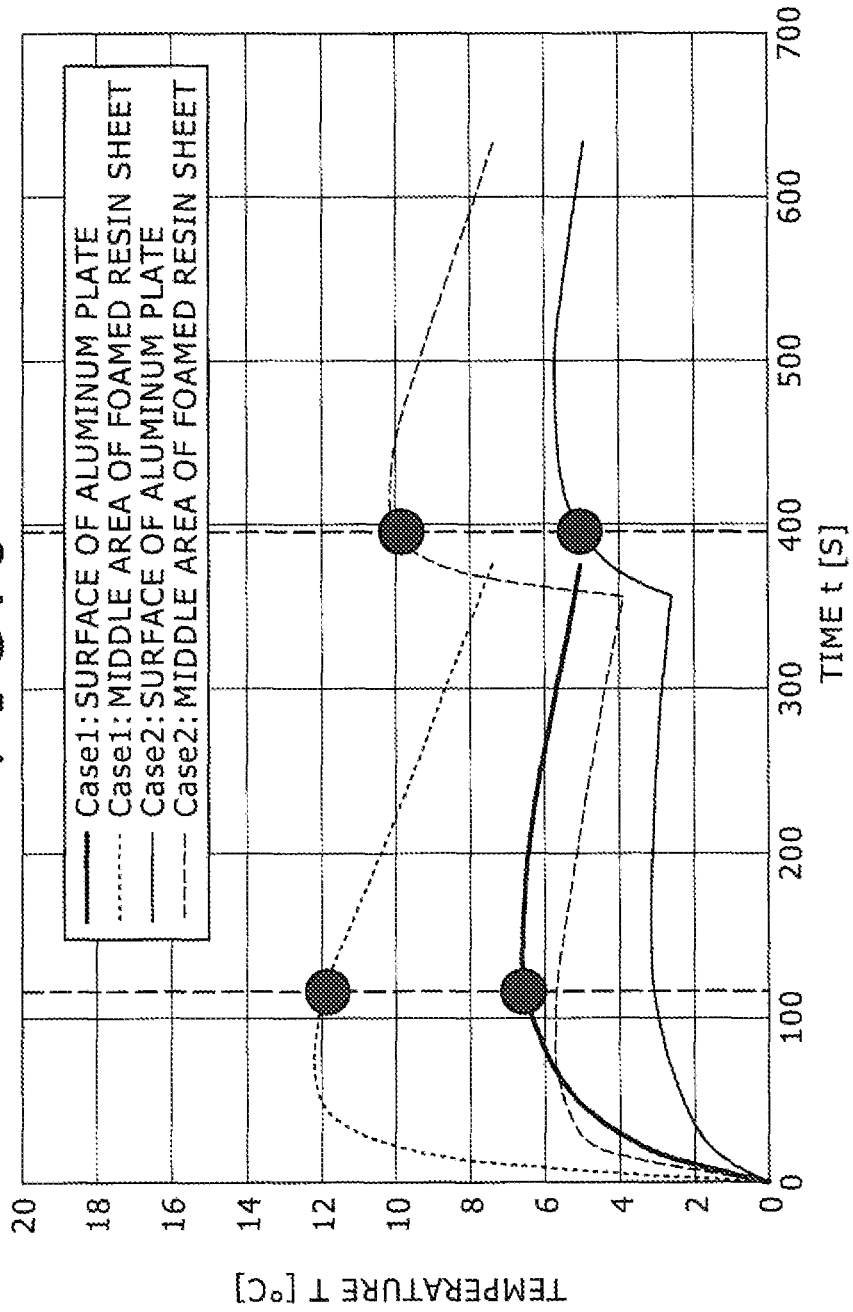
FIG. 8 is a graph showing temporal changes in the temperature difference between the central part and the peripheral area of the flat sheet.

FIG. 6 shows a calculation result of temperature changes in a surface area 2' of the aluminum plate 2 and a middle area 4a' of the foamed resin sheet 4a (see FIG. 5B) at the representative point provided in the central part of the flat sheet. FIG. 7 shows a calculation result of temperature changes in a surface area 2' of the aluminum plate 2 and a middle area 4a' of the foamed resin sheet 4a at the representative point provided in the peripheral area of the flat sheet. FIG. 8 shows a temporal change in a temperature difference between the central part and the peripheral area of the flat sheet. Black round marks in FIG. 8 represent the timing of passing 160° C., a melting point of polypropylene. The temperature difference in the surface area 2' of the aluminum plate 2 and the middle area 4a' of the foamed resin sheet 4a at this timing was compared between Case 1 and Case 2. As a result, the temperature difference in the middle area 4a' of the foamed resin sheet 4a is smaller by 1.9° C. in Case 2, and the temperature difference in the surface area 2' of the aluminum plate 2 is also smaller by 1.5° C. in Case 2. Therefore, providing the soaking bath 21 reduces the temperature difference between the central part and the peripheral area of the plane sheet.

Figure 9A:
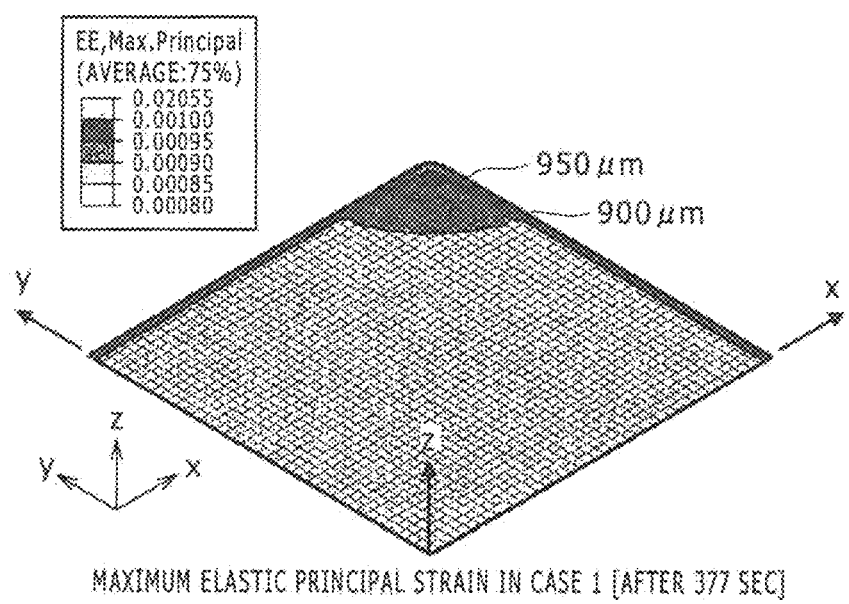
FIG. 9A is a view showing an analysis result of a maximum elastic principal strain generated in the aluminum plate in Case 1.
Figure 9B:
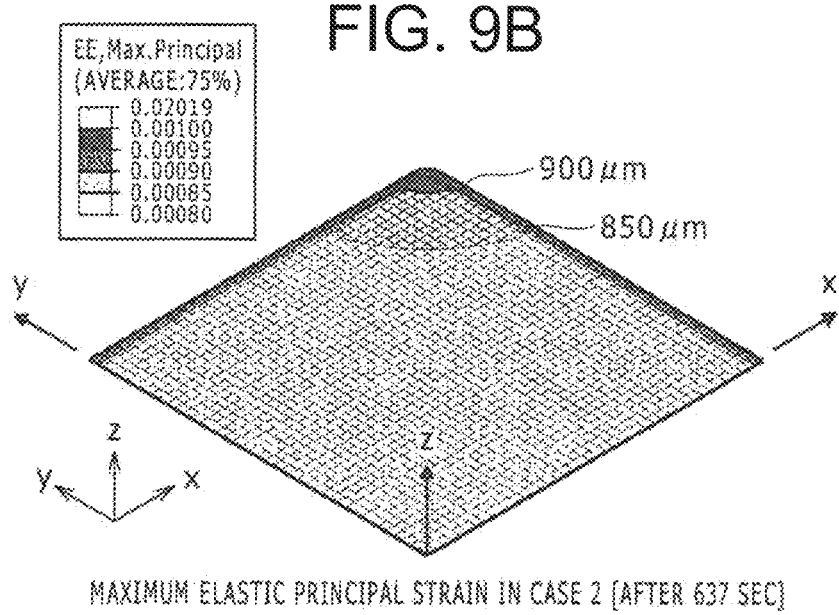
FIG. 9B is a view showing an analysis result of a maximum elastic principal strain generated in the aluminum plate in Case 2.
Figure 10A:
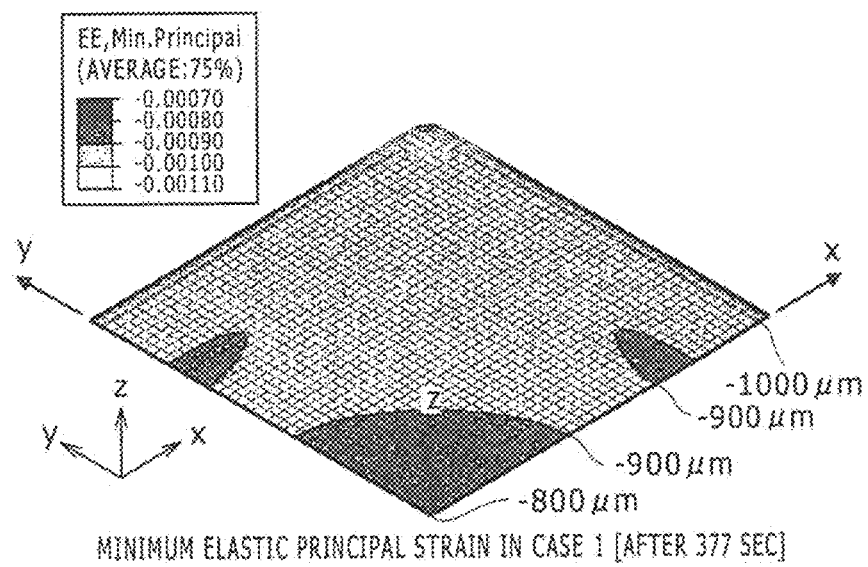
FIG. 10A is a view showing an analysis result of a minimum elastic principal strain generate in the aluminum plate in Case 1.
Figure 10B:
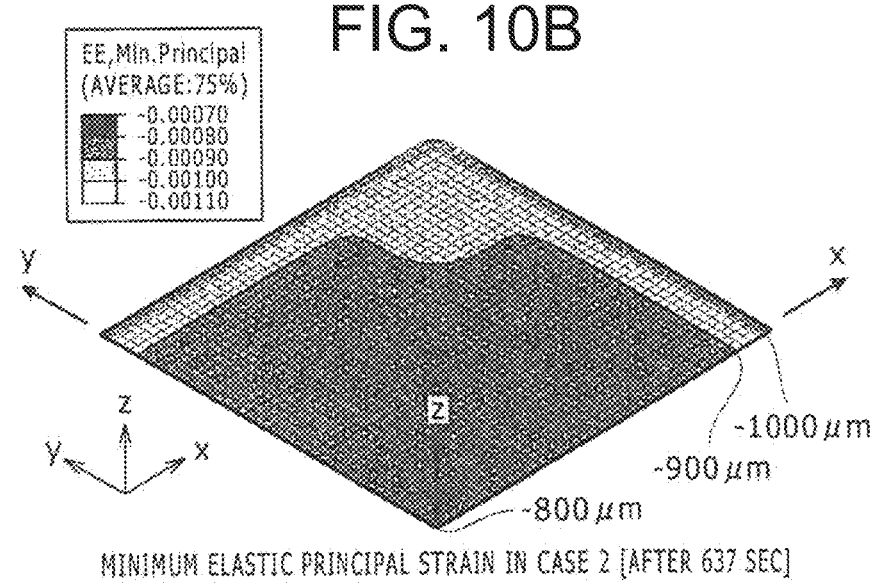
FIG. 10B is a view showing an analysis result of a minimum elastic principal strain generate in the aluminum plate in Case 2.

Analysis results of a maximum elastic principal strain and a minimum elastic principal strain generated in the aluminum plate 2 due to the temperature difference described above when the temperature of the foamed resin sheet 4a becomes 100° C. are shown in FIGS. 9A and B, and FIGS. 10A and B, respectively. FIG. 9A shows an analysis result of a maximum elastic principal strain in Case 1, while FIG. 9B shows an analysis result of a maximum elastic principal strain in Case 2. FIG. 10A shows an analysis result of a minimum elastic principal strain in Case 1, while FIG. 10B shows an analysis result of a minimum elastic principal strain in Case 2. Both the maximum elastic principal strain and the minimum elastic principal strain are smaller in Case 2 than in Case 1, demonstrating that providing the soaking bath 21 reduces thermal deformation and suppresses the rippling phenomenon.

(Effects)

As described above, according to the method for manufacturing the foamed resin metal laminated sheet 1 and the manufacturing apparatus 10 thereof, when the foamed resin metal laminated sheet 1 is cooled to the room temperature, it is temporarily cooled to the soaking temperature and held at the soaking temperature, and then cooled to the room temperature. A variation in cooling speed in the foamed resin sheet 4a can be suppressed by temporarily holding the foamed resin metal laminated sheet 1 at the soaking temperature to make the temperature of the foamed resin sheet 4a uniform over the entire area of the foamed resin metal laminated sheet 1, and then cooling the foamed resin metal laminated sheet 1 to the room temperature. In this way, the rippling phenomenon due to thermal strain caused by the variation in cooling speed in the foamed resin sheet 4a can be suppressed.

The soaking temperature is set in the range of not lower than Tm but not higher than 1.3 Tm, where Tm represents a melting point of the foamed resin of the foamable resin sheet 4b (foamed resin sheet 4a). This can keep the foamed resin sheet 4a in a melted state in the entire area of the foamed resin metal laminated sheet 1 in the soaking bath 21 for holding the foamed resin metal laminated sheet 1 at the soaking temperature. In this way, the initiation timing of solidifying the foamed resin sheet 4a can be synchronized in the entire area of the foamed resin metal laminated sheet 1 in the transition from the soaking bath 21 to the room temperature cooling unit 22, thus the variation in cooling speed in the foamed resin sheet 4a can be further suppressed.

Further, the foamable resin sheet 4b made of polypropylene is uniformly foamed. Rigidity and lightweight properties can be improved in the foamed resin metal laminated sheet 1 containing the metal plates 2 made of aluminum.

Furthermore, metals that are not efficiently heated by a far infrared radiation heating method due to heat-ray reflection can also be suitably heated by the soaking bath 21 using a hot gas circulation type heating furnace.

Second Embodiment (Apparatus for Manufacturing Foamed Resin Metal Laminated Sheet)

Next, a manufacturing apparatus 210 according to the second embodiment of the present invention will be described. Note that if a component is same as described above, the component bears the same reference number and its description is omitted. The manufacturing apparatus 210 of the present embodiment is different from the manufacturing apparatus 10 of the first embodiment in that a cooling unit 12 is provided with a second soaking bath (second soaking unit) 23 between the soaking bath 21 and the room temperature cooling unit 22 as shown in FIG. 11.

The second soaking bath 23 is a hot gas circulation type heating furnace and its internal temperature is hold at a second soaking temperature lower than a soaking temperature equivalent to the internal temperature of the soaking bath 21 and higher than room temperature (20° C.). The foamed resin metal laminated sheet 1 held at the soaking temperature in the soaking bath 21 is subsequently conveyed to the second soaking bath 23, cooled to the second soaking temperature, and temporally held at the second soaking temperature. Then the foamed resin metal laminated sheet 1 was conveyed to the room temperature cooling unit 22 and cooled from the second soaking temperature to the room temperature in the air.

As described above, the foamed resin metal laminated sheet 1 is held at the soaking temperature to make the temperature of the foamed resin sheet 4a uniform over the entire area of the foamed resin metal laminated sheet 1, and then the foamed resin metal laminated sheet 1 is held at the second soaking temperature. As such, a variation in cooling speed in the foamed resin sheet 4a can be further suppressed by making the temperature of the foamed resin sheet 4a uniform over the entire area of the foamed resin metal laminated sheet 1.

A single second soaking bath 23 is provided in the present embodiment, however, two or more second soaking bathes 23 may also be provided in tandem. In this case, the second soaking temperature is set lower in the second soaking bath 23 in the downstream side than in the second soaking bath 23 in the upstream side. That is, two or more second soaking bathes 23 are provided in tandem in order to sequentially lower the second soaking temperature. In this way, the temperature of the foamed resin metal laminated sheet 1 decreases stepwise from the soaking temperature to the room temperature as coming from the second soaking bathes 23 to the room temperature cooling unit 22.

The step of temporally holding the foamed resin metal laminated sheet 1 at the second soaking temperature to make the temperature of the foamed resin sheet 4a uniform over the entire area of the foamed resin metal laminated sheet 1 is performed a plurality of times while lowering the second soaking temperature each time. The variation in cooling speed in the foamed resin sheet 4a can be further suppressed by decreasing stepwise the temperature of the foamed resin sheet 4a in this way.

A configuration in which the step of making the temperature of the foamed resin sheet 4a uniform over the entire area of the foamed resin metal laminated sheet 1 is performed a plurality of times is not limited to the case where a plurality of second soaking bathes 23 are physically provided. The step of making the temperature of the foamed resin sheet 4a uniform over the entire area of the foamed resin metal laminated sheet 1 may be performed a plurality of times by decreasing stepwise the second soaking temperature a plurality of times within a single second soaking bath 23.

A configuration is not limited to a case where the soaking bath 21 and the second soaking bath 23 are separately provided, and a configuration in which the soaking bath 21 doubles as the second soaking bath 23 may also be used. That is, the temperature of the soaking bath 21 may be set to the soaking temperature to keep the foamed resin sheet 4a in a melted state, and then the temperature of the soaking bath 21 may be lowered to the second soaking temperature to hold the foamed resin metal laminated sheet 1 at the second soaking temperature.

(Effects)

As described above, according to the method for manufacturing the foamed resin metal laminated sheet 1 and the manufacturing apparatus 210 thereof, the foamed resin metal laminated sheet 1 is held at the soaking temperature to make the temperature of the foamed resin sheet 4a uniform over the entire area of the foamed resin metal laminated sheet 1. Subsequently, the foamed resin metal laminated sheet 1 is held at the second soaking temperature to make the temperature of the foamed resin sheet 4a uniform over the entire area of the foamed resin metal laminated sheet 1. Thus the variation in cooling speed in the foamed resin sheet 4a can be further suppressed.

The step of temporally holding the foamed resin metal laminated sheet 1 at the second soaking temperature to make the temperature of the foamed resin sheet 4a uniform over the entire area of the foamed resin metal laminated sheet 1 is performed a plurality of times by setting the second soaking temperature lower than the previous step and decreasing stepwise the temperature of the foamed resin sheet 4a. In this way, the variation in cooling speed in the foamed resin sheet 4a can be further suppressed.

Modifications of the Present Embodiments

The embodiments of the present invention described herein are merely illustrative of specific examples and are in no way limitative on the present invention in particular, thus a specific configuration and the like may be arbitrarily modified in designing. Further, the mode of operations and effects described in the embodiments of the present invention are mere recitations of the most preferable mode of operations and effects, which may be obtained by the present invention, and the mode of operations and effects of the present invention are in no way limitative on those described in the embodiments of the present invention.

The present application is based on Japanese Patent Application No. 2012-185412 filed on Aug. 24, 2012, and the contents of the patent application are hereby incorporated by way of reference.

EXPLANATION OF REFERENCE NUMERALS

1 Foamed resin metal laminated sheet
1a Foamable resin metal laminated sheet
2 Aluminum plate (Metal plate)
4a Foamed resin sheet
4b Foamable resin sheet
10, 210 Manufacturing apparatuses
11 Heating furnace (Heating unit)
12 Cooling unit
13 Conveyor
21 Soaking bath (Soaking unit)
22 Room temperature cooling unit
23 Second soaking bath (Second soaking unit)
50 Manufacturing apparatus

The invention claimed is:

1. A method for manufacturing a foamed resin metal laminated sheet, comprising the steps of:
　laminating a first metal plate on one side and a second metal plate on the other side of a foamable resin sheet in an unfoamed state to form a foamable resin metal laminated sheet;
　heating the foamable resin metal laminated sheet and foaming the foamable resin sheet to form a foamed resin metal laminated sheet; and
　cooling the foamed resin metal laminated sheet to room temperature, the cooling step comprising:
　　cooling the foamed resin metal laminated sheet to a soaking temperature lower than a foaming temperature of the foamable resin sheet and higher than the room temperature, and holding the foamed resin metal laminated sheet at the soaking temperature until a surface temperature of the middle area of each of the metal plates becomes equal to a surface temperature of a peripheral area of each of the metal plates, respectively; and
　　cooling the foamed resin metal laminated sheet to the room temperature after the step of cooling to the soaking temperature and holding at the soaking temperature, and
　wherein the soaking temperature is set in the range of not lower than Tm but not higher than 1.3 Tm, where Tm represents a melting point of a foamed resin of the foamable resin sheet, such that the formed resin sheet is in a melted state in the entire area of the formed resin metal laminated sheet held at the soaking temperature.

2. The method for manufacturing the foamed resin metal laminated sheet according to claim 1, wherein the cooling step further comprises, between the step of cooling to the soaking temperature and the step of cooling to the room temperature, a step of cooling the foamed resin metal laminated sheet at a second soaking temperature lower than the soaking temperature and higher than the room temperature, and holding the foamed resin metal laminated sheet at the second soaking temperature.

3. The method for manufacturing the foamed resin metal laminated sheet according to claim 2, wherein the foamable resin sheet contains polypropylene and the metal plates contain aluminum.

4. The method for manufacturing the foamed resin metal laminated sheet according to claim 1, wherein the foamable resin sheet contains polypropylene and the metal plates contain aluminum.

5. A method for manufacturing a foamed resin metal laminated sheet, comprising the steps of:
　laminating a first metal plate on one side and a second metal plate on the other side of a foamable resin sheet in an unfoamed state to form a foamable resin metal laminated sheet;

heating the foamable resin metal laminated sheet and foaming the foamable resin sheet to form a foamed resin metal laminated sheet; and cooling the foamed resin metal laminated sheet to room temperature, the cooling step comprising:
    cooling the foamed resin metal laminated sheet by natural convection and radiation in air to a soaking temperature lower than a foaming temperature of the foamable resin sheet and higher than the room temperature, and holding the foamed resin metal laminated sheet at the soaking temperature until a surface temperature of the middle area of each of the metal plates becomes equal to a surface temperature of a peripheral area of each of the metal plates, respectively; and
    cooling the foamed resin metal laminated sheet to the room temperature after the step of cooling to the soaking temperature and holding at the soaking temperature, and
wherein the soaking temperature is set in the range of not lower than Tm but not higher than 1.3 Tm, where Tm represents a melting point of a foamed resin of the foamable resin sheet, such that the formed resin sheet is in a melted state in the entire area of the formed resin metal laminated sheet held at the soaking temperature.

* * * * *